United States Patent

Wehmeyer et al.

[11] Patent Number: 5,543,857
[45] Date of Patent: Aug. 6, 1996

[54] GRAPHICAL MENU FOR A TELEVISION RECEIVER

[75] Inventors: Keith R. Wehmeyer, Fishers; Robert J. Logan; Robert H. Miller, both of Indianapolis; Sheila R. Augaitis; Aaron H. Dinwiddie, both of Fishers, all of Ind.

[73] Assignee: Thomson Consumer Electronics, Inc., Indianapolis, Ind.

[21] Appl. No.: 347,786

[22] Filed: Nov. 30, 1994

Related U.S. Application Data

[63] Continuation of Ser. No. 328,654, Oct. 25, 1994, abandoned.

[51] Int. Cl.$^6$ ............................ H04N 5/262; H04N 5/445
[52] U.S. Cl. ..................... 348/589; 348/600; 348/564; 348/565
[58] Field of Search ......................... 348/564, 565, 348/569, 584, 589, 600; 358/183, 22, 22 PIP; 345/115, 116, 146, 902; H04N 5/445, 5/45, 5/262, 5/278

[56] References Cited

U.S. PATENT DOCUMENTS

| | | | |
|---|---|---|---|
| 4,644,401 | 2/1987 | Gaskins | 348/589 |
| 4,855,813 | 8/1989 | Russell | 348/589 |
| 5,077,608 | 12/1991 | Dubner | 348/584 |
| 5,128,766 | 7/1992 | Choi | 348/564 |
| 5,233,423 | 8/1993 | Jernigan | 348/564 |

OTHER PUBLICATIONS

"Copies of Actual Screen Displays produced by Sony STR-D 1090 and STR-D2090 FM Stereo Receivers".

Primary Examiner—Victor R. Kostak
Assistant Examiner—Sherrie Hsia
Attorney, Agent, or Firm—Joseph S. Tripoli; Peter M. Emanuel; Thomas F. Lenihan

[57] ABSTRACT

A television receiver, includes a graphics generator for generating for display a stylized image of the environment in which the user's physical television receiver is situated. The image includes graphical representations of functions which are available for selection and control by a user, and at least one of which functions affect the display of the video image. In one embodiment of the invention, a video inset-image from a PIP unit is completely surrounded by a graphics image. The PIP image is aligned with the screen of a graphically displayed television receiver to portray an image of a television displaying an received television program. Alternatively, an animated graphics presentation is displayed in the screen area of the graphically-displayed television receiver to simulate live video. In another embodiment, a stylized display of the user's room is altered in response to user input regarding the user's consumer electronics equipment, and submenu operational choices are enabled or disabled accordingly.

4 Claims, 9 Drawing Sheets

GRAPHICAL MENU FOR A TELEVISION RECEIVER

This is a continuation of U.S. patent application Ser. No. 08/328,654 filed Oct. 25, 1994, abandoned.

FIELD OF THE INVENTION

The subject invention generally concerns menu generation circuitry for electronics equipment, such as, television receivers, and specifically relates to a novel "graphical menu".

BACKGROUND OF THE INVENTION

Control of modern television receivers has become increasingly complicated in recent years, as more and more user-controllable features have been implemented by manufacturers in television receivers of ever-greater complexity. For example, in addition to the normal television receiver controls, some user-controllable features which were unheard-of just a few years ago are now commonly available to consumers, such as, COLOR TEMPERATURE, VIDEO NOISE REDUCTION, SURROUND SOUND, and SLEEP TIMER, just to name a few.

In an attempt to present an orderly array of these controllable functions, manufacturers introduced the concept of function control menus. In such well-known schemes, a menu is called up to the screen, and a particular function to be controlled, such as COLOR, is selected by the viewer for adjustment. Unfortunately, the menus soon grew too long for convenient screen display, and were expanded to include sub-menus allowing selection of related items. For example, selecting the menu item entitled VIDEO brings up yet another menu listing such related items as, BRIGHTNESS, CONTRAST, COLOR, TINT, SHARPNESS, COLOR TEMPERATURE, and VIDEO NOISE REDUCTION. While such an arrangement may seem straight-forward to a computer programmer, it may be extremely confusing, and even intimidating, to the average nontechnical user, who was quite happy to adjust the brightness of his receiver by turning a knob on the front panel, without having to wade through a mire of menus and submenus to accomplish that simple task. It is important to note that unlike the main menus found on today's receivers, the array of knobs on the front panels of yesterday's receivers formed an intuitive object-oriented guide which naturally, and in a nonconfusing fashion, led the viewer to the correct control for accomplishing his task.

SUMMARY OF THE INVENTION

In a first embodiment of the invention, a menu generation arrangement for use in a television receiver, includes a graphics generator for generating for display a stylized image of the environment in which the user's physical television receiver is situated. The image includes graphical representations of functions which are available for selection and control by a user, and at least some of which functions affect the display of the video image.

In a second embodiment of the invention, a menu generator for use in a television receiver, comprises a graphics generator for generating a graphics signal for display, a video processor for processing a video signal, and picture-in-picture processor coupled to the video processor. The picture-in-picture processor derives a signal from the video signal for use as the secondary image portion. The video processor produces a combined signal which when displayed comprises a video image completely surrounded by a graphics image. The graphics image includes graphical representations of functions to be controlled, which are selectable for control by a user, and at least some of the selectable functions affect the display of the video image. In this embodiment of the invention, the PIP processor displays the PIP image in a screen location in which it is aligned with the screen of a graphically displayed television receiver to portray an image of a television displaying an actual received television program.

In yet another embodiment of the invention, an animated graphics presentation is displayed in the screen area of the graphically-displayed television receiver to simulate live video to further enhance the perception of the displayed image as representation of the user's own environment.

In yet another embodiment of the invention the stylized display of the user's room is altered in response to user input regarding the user's consumer electronics equipment. In this embodiment, submenu operational choices are enabled or disabled depending upon the user's input as to which pieces of equipment are connected to the system.

DETAILED DESCRIPTION OF THE DRAWING

Figure 1:
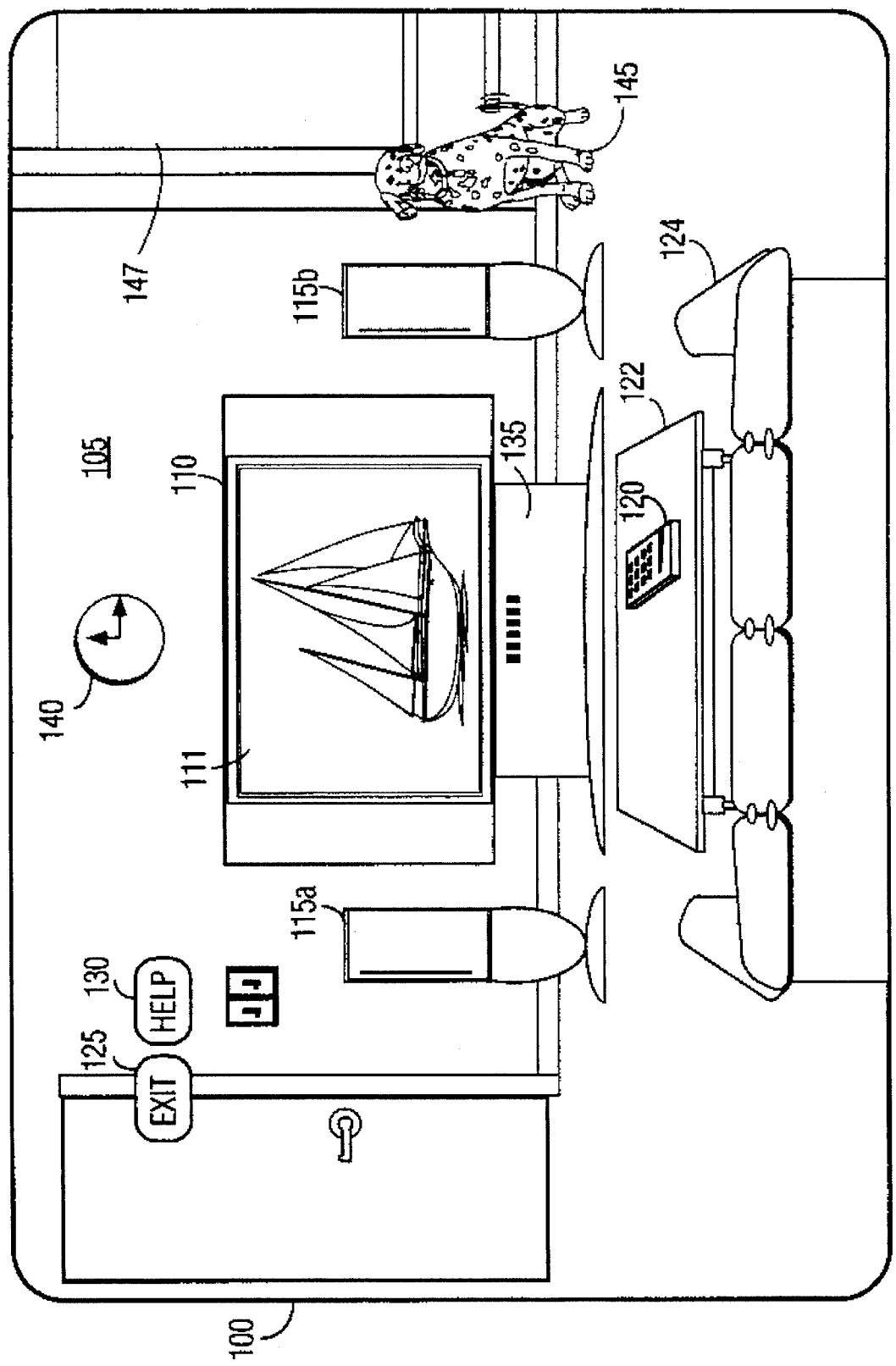
FIGS. 1 and 2 show a screen display comprising a graphical menu which includes a depiction of a room having a television receiver displaying active video.

Referring to FIG. 1, graphical menu, generally designated 105, is displayed on a screen 100 of a television receiver. Graphical menu 105 is a simplified view of a room which is understood to be the viewer's own family room (or living room), and to convey this understanding, the room includes features commonly found in a family room, such as, a television receiver 110, a pair of speakers 115a and 115b, a coffee table 122, a couch 124, a wall clock 140, and even the family dog 145. It is intended that the viewer feel comfortable with the scene, so to further enhance the viewer's sense of familiarity with the scene, a remote control unit 120 is shown placed on the coffee table, and an actual television image, derived from a PIP (i.e., picture-in-picture) processor appears to be displayed on the screen 111 of virtual television receiver 110. A depiction of the daytime sky is seen outside a virtual window 147 during daylight hours, and the nighttime sky is seen during the evening. Also shown are two "buttons" 125 and 130, labelled EXIT AND HELP, respectively, the functions of which will be described below.

Figure 9:
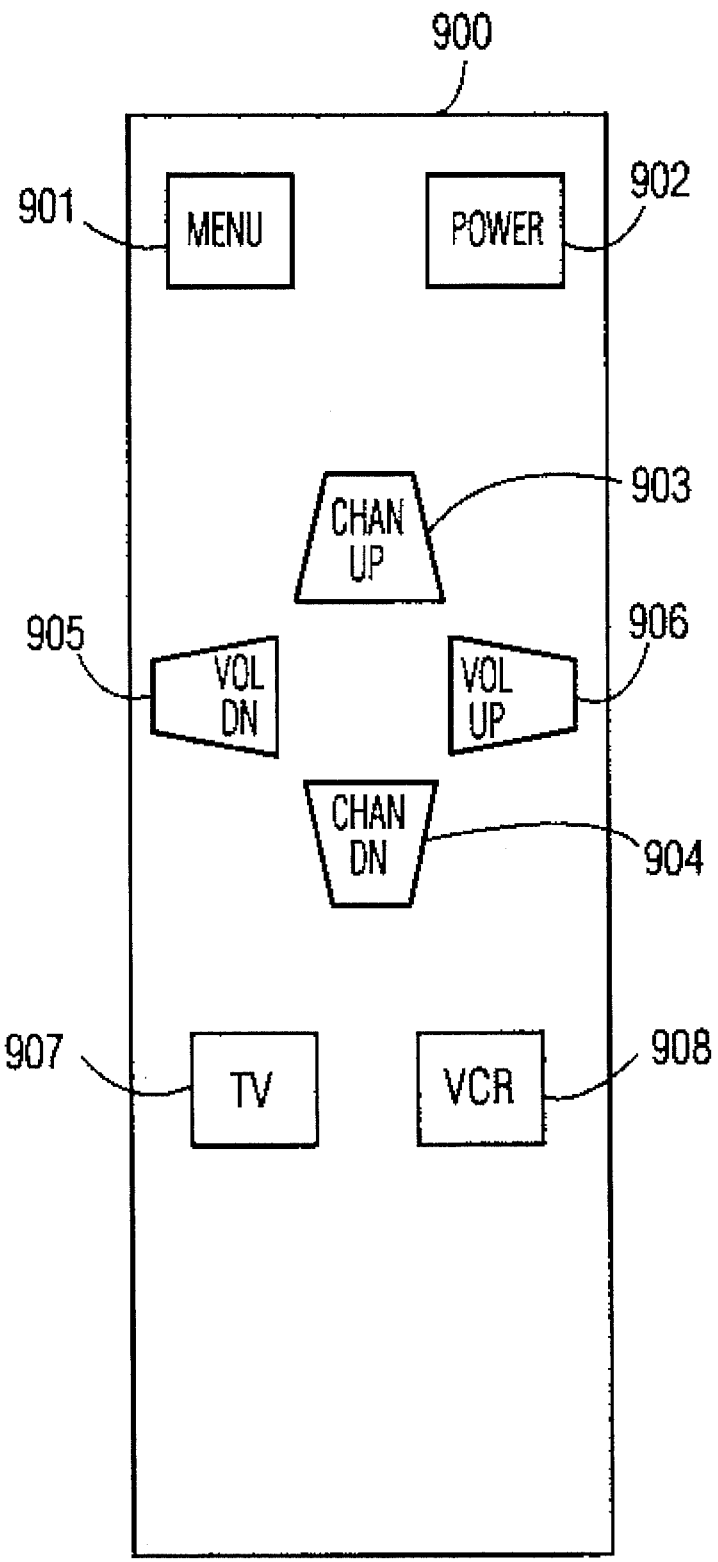
FIG. 9 is a simplified drawing of a remote control unit suitable for use with the invention.

The scene described above is not merely a graphics display, but rather is a main menu of control functions presented in what is believed to be an unintimidating, non-threatening, object-oriented fashion. Simple access to this graphical menu is gained by pressing MENU key 901 on a remote control unit 900 of FIG. 9. During the time that the graphical menu is displayed, CHAN UP, CHAN DN, VOL UP, and VOL DN keys 903, 904, 905, and 906 are no longer used to change channels or for volume control, but rather are used as X and Y-direction cursor control keys for use by the viewer to "navigate" through the graphical menu, as described below.

Figure 2:
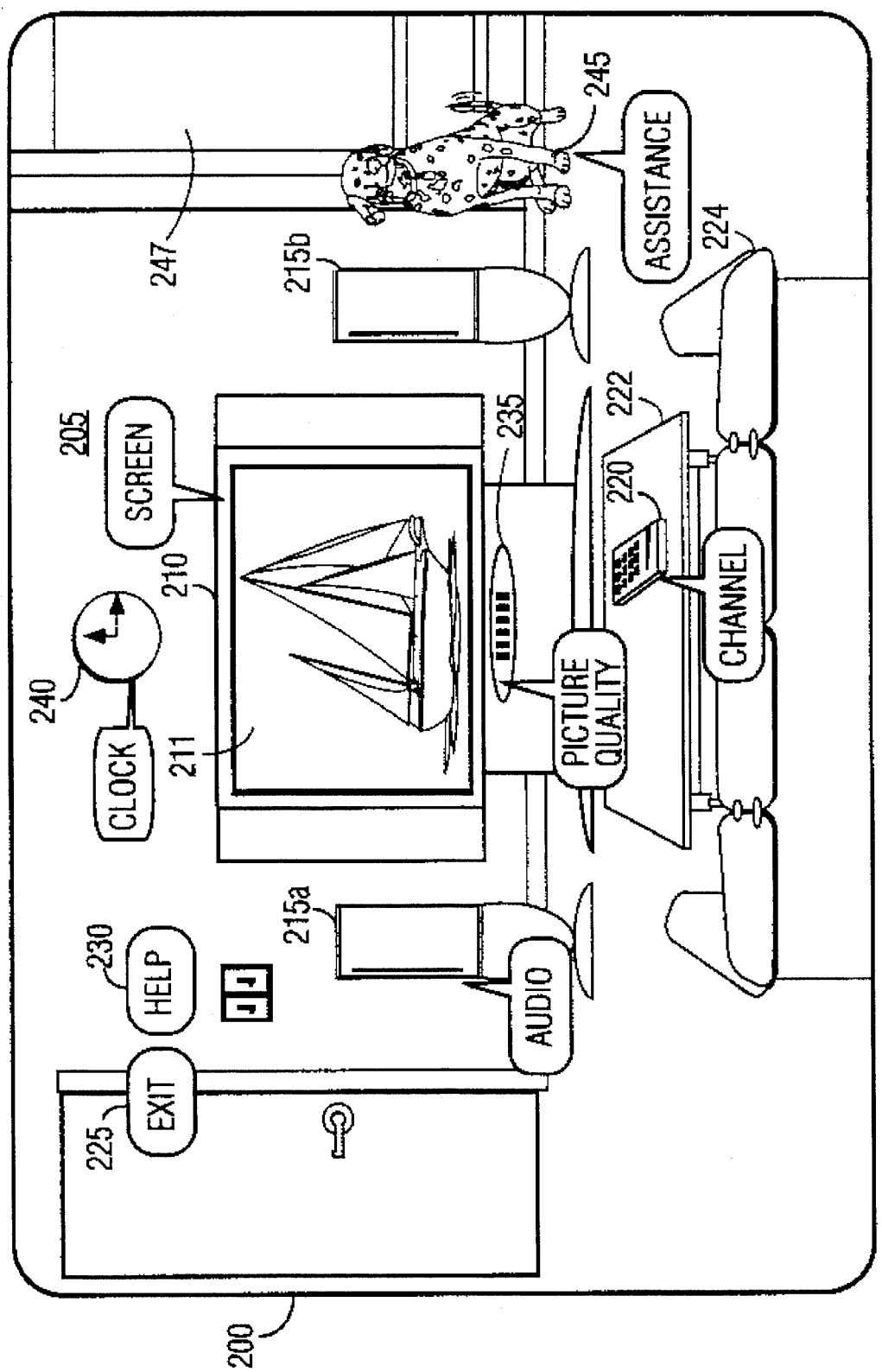

FIG. 2 is almost identical to FIG. 1, with the exceptions that each of the selectable objects is shown surrounded by graphical highlighting, and each has a "balloon label" displayed near it. In reality, only one of the selectable items will be highlighted and labelled at a time, as cursor keys 903–906 are operated. The functions of each of the selectable objects of the main menu will now be described.

A user operates cursor keys 903–906 to highlight for example, display screen 211 of television receiver 210, and then presses MENU key 901 to accomplish the selection of that particular submenu. A SCREEN submenu is displayed which provides for the selection of SINGLE SCREEN, PIX-IN-PIX (PIP), SPLIT SCREEN, PIX-OUTSIDE OF-PIX (POP), and CHANNEL GUIDE. CLOSED CAPTIONING display options are also provided in the screen submenu.

Selecting the PICTURE QUALITY submenu by highlighting the control panel 235 of television receiver 210, causes the display of a graphical submenu which comprises "sliding adjustment bars" for the adjustment of CONTRAST, COLOR, TINT, BLACK LEVEL, and SHARPNESS. In addition one may enable, disable, or adjust the levels of COLOR WARMTH, VIDEO NOISE FILTER, AUTO COLOR, and a feature known as THEATER.

Clock 240 can be selected in the same fashion, and its submenu allows for the selection of time-related functions, such as TIME OF DAY, SLEEP FUNCTION AUTO TURN OFF.

Selecting the remote control unit 220, brings up the CHANNEL submenu which contains channel-related commands, such as PARENTAL CONTROL of a particular channel, selection of signal source (e.g., ANTENNA A), signal type (CABLE), and AUTO CHANNEL SEARCH. When PARENTAL CONTROL is ON, only channels listed in the parent approved list will be accessible via the front panel. Thus, parents can lock out certain channels by taking the remote control unit with them.

Figure 3:
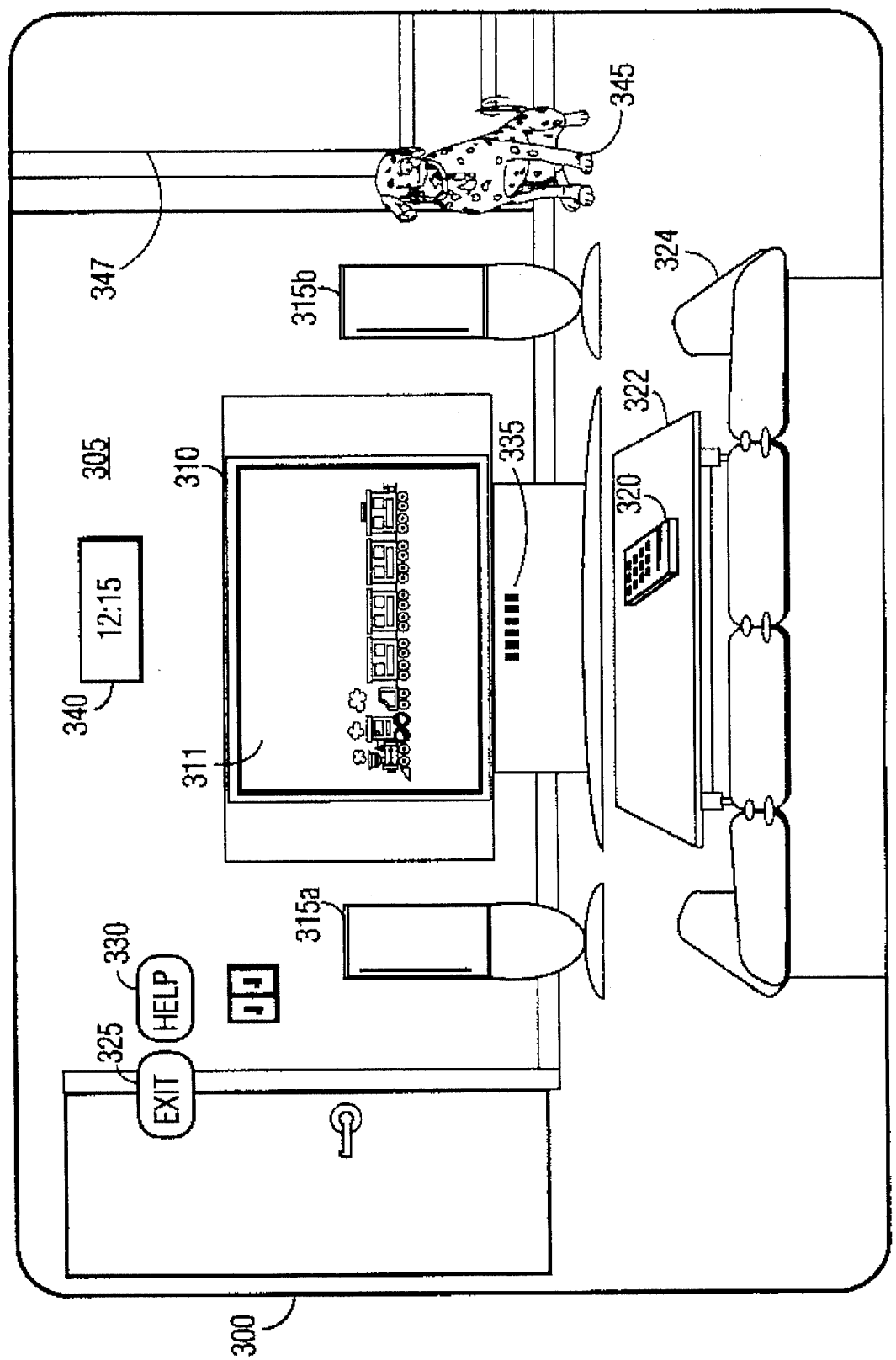
FIG. 3 shows a screen display comprising a graphical menu, which includes depiction of a room having a television receiver displaying animated graphics to simulate reception of a television program.

Selecting Man's Best Friend, the dog 245, causes the system controller to display an array of ASSISTANCE submenu choices, such as SETUP, CONNECTIONS, PREFERENCES, and ABOUT YOUR TV. SETUP is a step by step routine to aid the user in installing his television receiver. CONNECTIONS is an interactive display which aids the user in connecting various external equipment (such as a VCR) to his receiver by actually presenting a drawing of the rear connection panels of both the TV and the VCR, and showing the user where each connection should be made. PREFERENCES allows the selection of a TEXT MAIN MENU or the FAMILY ROOM graphical Menu, the color of the graphics of the family room display, and a clock style choice of an analog time display as shown in FIGS. 1 and 2, or a digital time display as shown in FIG. 3.

Selecting the HELP button causes a display of detailed instructions. Selecting EXIT causes a return to the last channel watched. Selecting ABOUT YOUR TV allows a choice of a self-paced tour of the television system, or an interactive remote control help function.

It was noted above that the PIP unit of the actual receiver is used to display a PIP image in the screen area 211 of virtual television receiver 210. The sailboat of FIG. 1 and 2 is intended to convey the idea of active video being displayed by the PIP processor. With respect to FIG. 3, the cartoon-like train on screen 311 of receiver 310 is intended to convey the idea that the FAMILY ROOM format for a graphical menu is useful even in a television receiver which does not have PIP capability, by using the graphics OSD chip to draw an animated figure in the screen area of the virtual TV.

Figure 4:
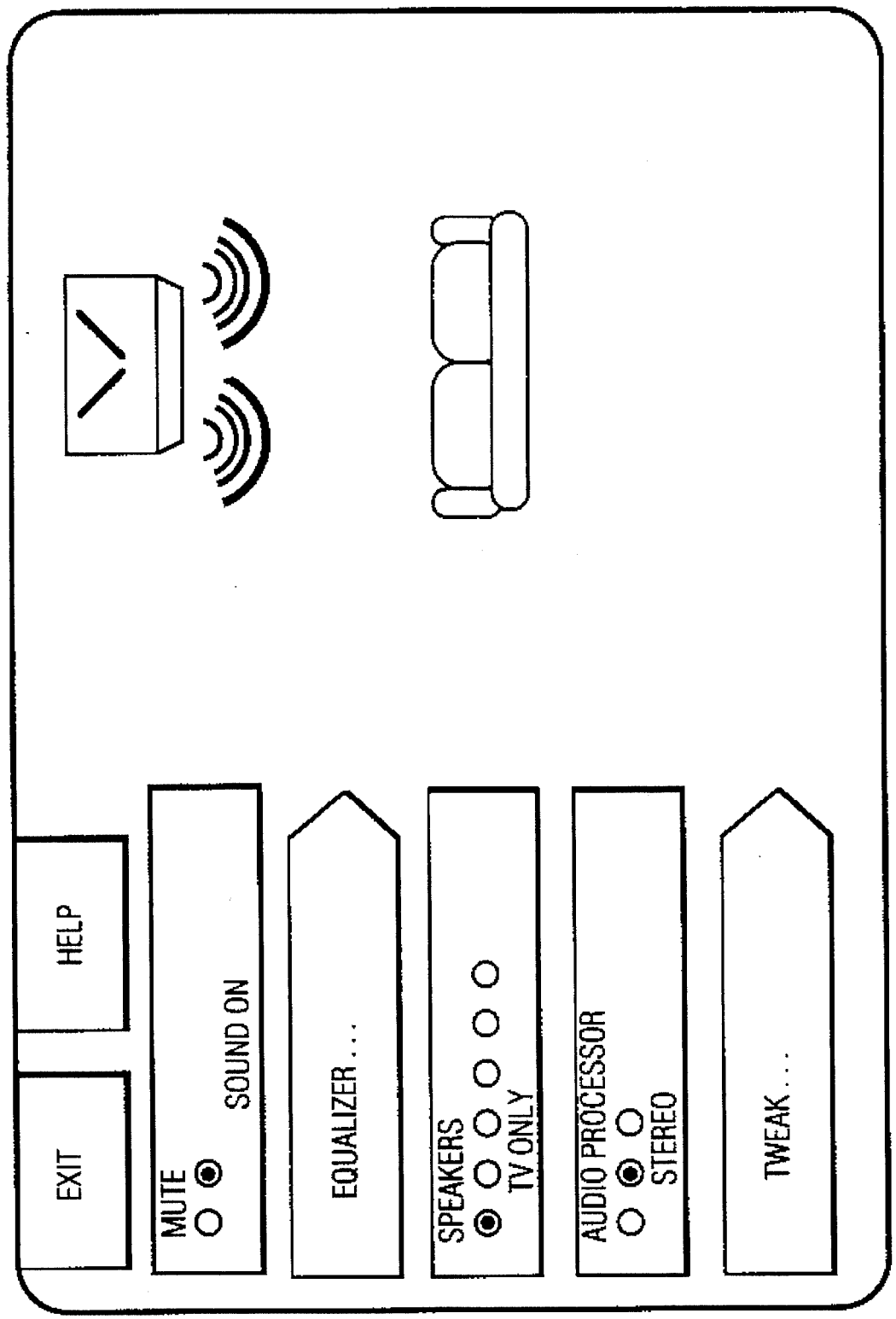
FIGS. 4–7 show an graphical audio submenu comprising a plan view of the room of FIGS. 1–3 which includes a depiction of the number of audio components specified by the user.
Figure 5:
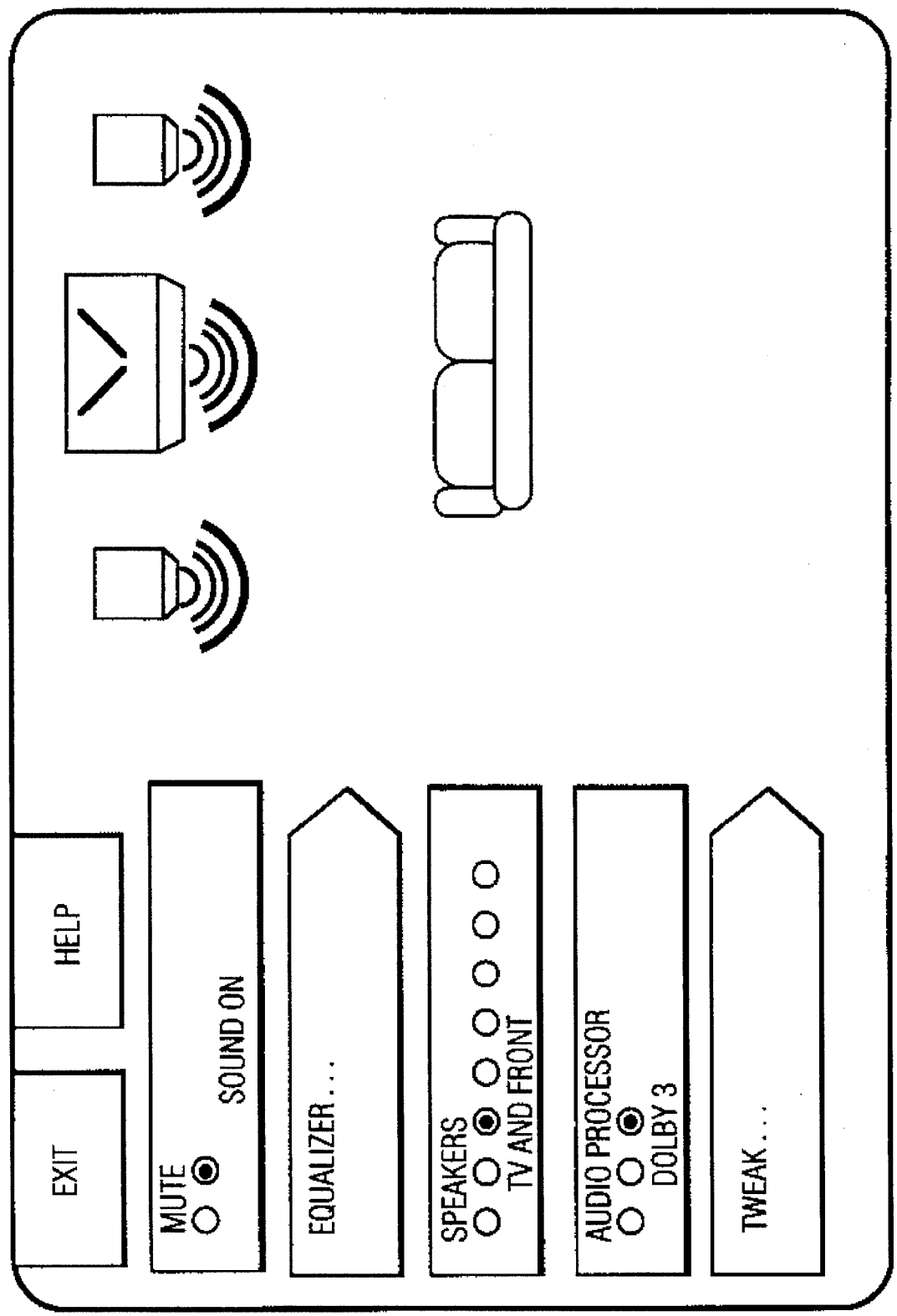
Figure 6:
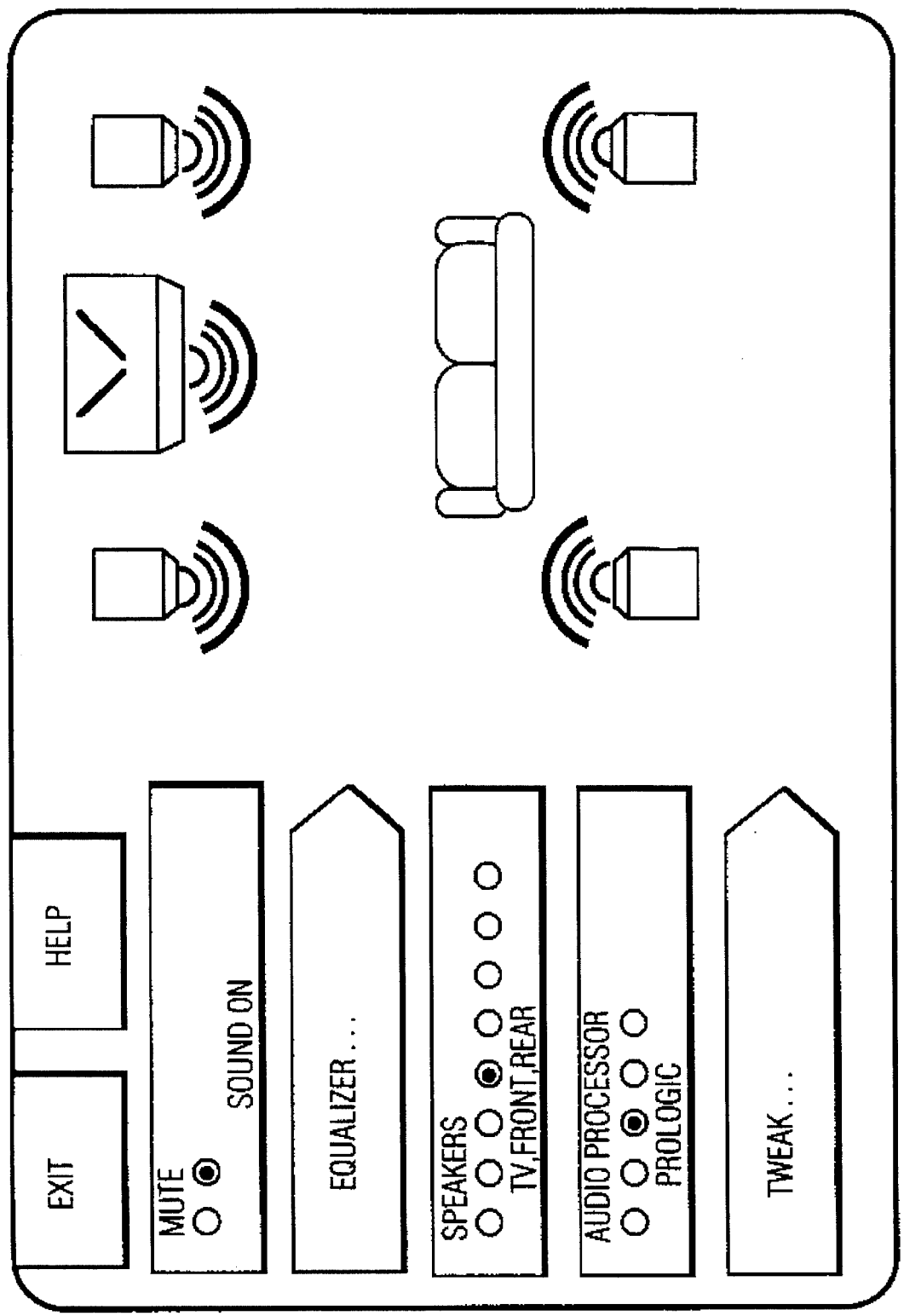
Figure 7:
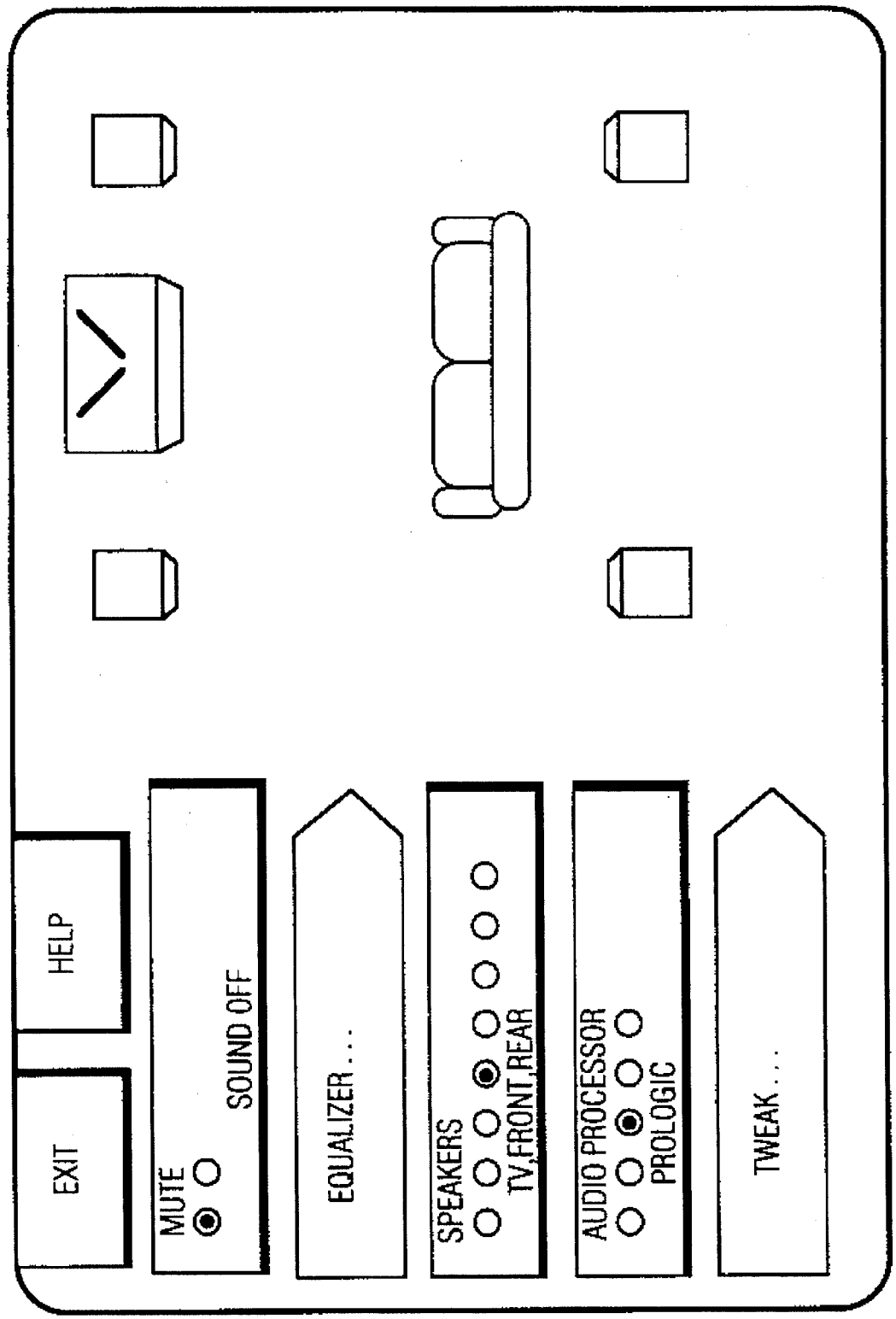

Selecting the AUDIO submenu by highlighting speakers 215*a*, 215*b* and pressing MENU key 901, causes the displays shown in FIGS. 4–7. FIGS. 4–7 are simplified, generic plan views ( i.e., overhead views) of the user's family room showing different speaker configurations. Each speaker configuration is a representation of the actual equipment which the user possesses, based on data entered by the user in response to the various options presented on the left side of the figure. FIG. 4 shows no external speakers, FIG. 5 shows two external speakers, and FIG. 6 shows four external speakers. Note that the number of selectable audio options increases with the number of external speakers. Dolby 3 ( which uses, left, right, and front speakers) is an available choice for the configuration of FIG. 5, but is not available for the configuration of FIG. 4. SURROUND SOUND (which uses front and rear speakers) is not a selectable feature for the configuration shown in FIGS. 4 or 5, but is available for the configuration of FIG. 6. That is, if the system, as configured, cannot support a particular audio processing function, choice of that function is not presented to the viewer. FIG. 7 shows the screen display of FIG. 6 after a user has selected the MUTE option. Note that the sound waves 650–658 are absent from FIG. 7 to illustrate lack of audio output. It is envisioned that differently-colored and differently-sized sound waves can be used to illustrate relative balance during balance adjustment. Other audio menu items include a graphical illustration of an equalizer.

Figure 8:
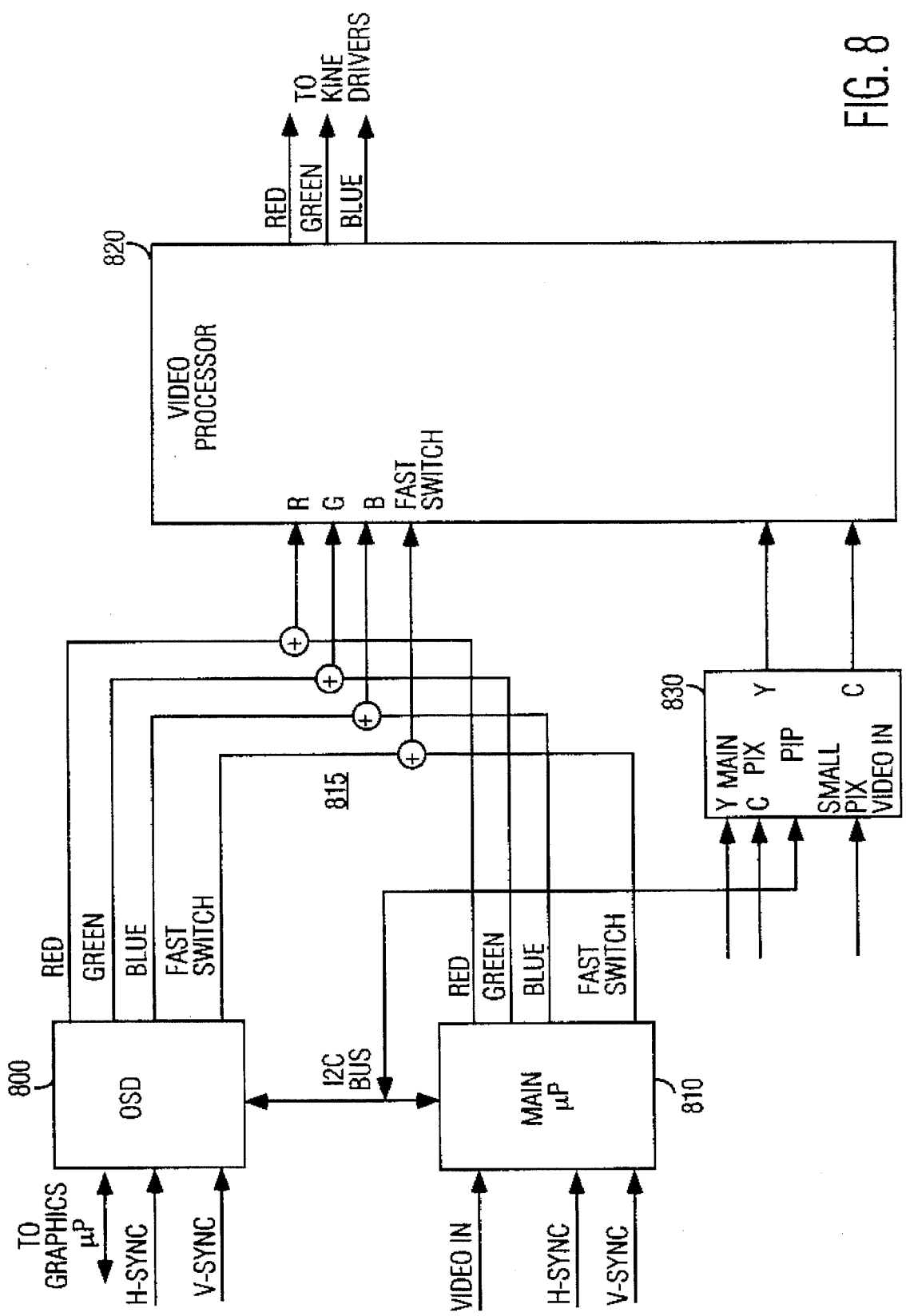
FIG. 8 shows, in block diagram form, the relevant portion of the circuitry of a television receiver operating in accordance with the invention.

FIG. 8 shows a simplified block diagram of that section of the receiver which provides the above-described screen displays. OSD (On Screen Display) Processor 800 is preferably a bit-mapped graphics generator for masking the majority of the display screen with graphics, under control of a Main Microprocessor 810. OSD Processor 800 produces image signals at Red, Green, and Blue color signal output terminals. Main Microprocessor 810 also receives a video signal from the television chassis and derives closed caption information therefrom. It produces closed caption display signals at Red, Green, and Blue color signal output terminals. The outputs of OSD Processor 800 and of Main Microprocessor 810 are summed together in an array of summing circuits, generally designated 815. These summing circuits may comprise, for example, the well-known non-additive mixer circuit, which has the property that it will pass the greater of the two signals at its inputs while blocking the lesser of the two input signals. The outputs of the summing circuits are applied to a VIDEO PROCESSOR unit 820 which also receives Y (luminance) and C (chrominance) component video signals from a PIP unit 830. The input signals for PIP unit 830 are provided by television chassis components which are conventional in nature, and are not shown. A FAST SWITCH signal generated by either OSD Processor 800 or Main Microprocessor 810 causes the graphics signal (or closed caption signal ) to be substituted for the video signal for the duration of the fast switching signal.

Main Microprocessor (i.e., system controller) 810 operating under control of its own software causes PIP unit 830 to automatically display a PIP image at the exact location of the screen display of the virtual television drawn by OSD processor 800 to complete the illusion of a family room having an operating television receiver. In the case of FIG. 3, the displayed position of the animated cartoon image of the train is updated every television field to create the illusion of motion across the screen 311 of virtual TV 310.

The phrases "system controller" and main microprocessor are used interchangeably herein and are intended to also encompass microcomputers and dedicated custom integrated circuits. The term "television receiver" is intended to encompass television receivers having a display device (commonly called TV sets) and television receivers not having a display device (such as VCRs).

What is claimed is:

1. Menu generation apparatus for use in a television receiver, comprising:

graphics generation means for generating a graphics signal for display, said graphics signal representing a graphics image;

video processing means for producing a processed video signal at an output; and picture-in-picture processing means for receiving first and second video signals and for producing a combined video signal comprising a main image portion and a secondary image portion at an output and coupling said combined video signal to said video processing means;

said picture-in-picture processing means deriving a secondary image signal from one of said first and second video signals for use as said secondary image portion;

said video processing means being coupled to said picture-in-picture processing means for receiving said secondary image signal and to said graphics generation means for receiving said graphics signal and producing a combined signal which when displayed comprises a video image completely surrounded by said graphics image;

wherein said graphics image includes graphical representations of functions to be controlled, said functions being selected for control by a user; and at least one of said functions affects the display of said processed video signal.

2. Menu generation apparatus for use in a television receiver, comprising:

graphics generation means for generating a graphics signal for display, said graphics signal representing a graphics image;

video processing means for producing a processed video signal at an output;

said video processing means including switch means having a first input coupled to receive a video signal and a second input coupled to receive said graphics signal, said switch means coupling one of said signals at said inputs to an output;

picture-in-picture processing means for receiving first and second video signals, said picture-in-picture processing means producing a combined video signal comprising a main image portion and a secondary image portion, said picture in picture processing means having an output coupled to said video processing means for applying said combined video signal thereto; and a controller for controlling said switch means and said picture-in-picture processing means;

said controller operating in a first mode for causing said picture-in-picture processing means to select said first video signal for use as said main image portion and said secondary image portion is derived from said second video signal; and said controller operating in a second mode for causing said switch means of said video processing means to select said graphics signal for use as said main image portion and said secondary image portion is derived from one of said first and second video signals;

said graphics image including graphical representations of functions to be controlled, said functions being selected for control by a user, at least one of said functions affecting the display of said processed video signal; and said controller operating in a third mode for causing said switch means of said video processor to select said graphics image only, said graphics image including a depiction of a screen of a television receiver, and said graphics generation means generates animated graphics for display on said screen of said depiction of said television receiver.

3. Menu generation apparatus for use in a television receiver, comprising:

graphics generation means for generating a graphics signal for display, said graphics signal representing a graphics image;

picture-in-picture processing means having inputs coupled to receive first and second video signals for producing a combined video signal comprising a main image portion and a secondary image portion;

video processing means for producing a processed video signal at an output; and said video processing means including fast switch means having a first input coupled to receive said combined video signal and a second input coupled to receive said graphics signal, said fast switch means coupling one of said signals at said inputs to an output; and a controller for controlling said switch means and said picture-in-picture processing means;

said controller operating in a first mode for causing said switch means of said video processing means to select said first video signal for use as said main image portion and said secondary image portion is derived from said second video signal; and said controller operating in a second mode for causing said switch means of said video processing means to select said graphics signal for use as said main image portion and said secondary image portion is derived from one of said first and second video signals;

said picture-in-picture processing means generating said combined video signal for displaying said secondary image portion in a first screen position in said first mode, and in a second different screen position in said second mode;

said graphics image displayed in accordance with said graphics signal including graphical representations of functions to be controlled, said functions being selectable for control by a user; and at least one of said functions affecting the display of said processed video signal.

4. Menu generation apparatus for use in a television receiver, comprising:

graphics generation means for generating a graphics signal for display, said graphics signal representing a graphics image;

video processing means for producing a processed video signal at an output; and;

said video processing means including switch means having a first input coupled to receive a video input signal and a second input coupled to receive said graphics signal for coupling one of said signals at said inputs to said output;

said graphics signal representing said graphics image comprising a main image portion and a secondary image portion, said main image portion being substantially static and said secondary image portion being dynamic; and a controller for controlling said graphics generation means and said switch means;

said graphics image including graphical representations of functions to be controlled, said functions being selected for control by a user; and at least one of said functions affecting the display of said processed video signal.

* * * * *